Patented Aug. 11, 1936

2,050,843

UNITED STATES PATENT OFFICE 2,050,843

MODIFIED VINYL RESIN AND PROCESS OF MAKING IT

Isadore M. Jacobsohn, Chicago, Ill., assignor to Coe Laboratories, Inc., Chicago, Ill., a corporation of Illinois No Drawing. Application April 6, 1933, Serial No. 664,771

10 Claims. (Cl. 106—22)

It is the object of my invention to produce a vinyl resin, and especially a vinyl-ester resin, which is substantially free from objectionable discoloration and at the same time is also substantially free from internal stresses which tend to distort it.

It is a further object to extend the permissible range of temperature within which vinyl resins may be worked with advantage, so that such working may be effectively done without the need of the high degree of skill and care which are at present required.

Because of a number of advantages, such as their resilient character, their stability to light and air under normal atmospheric conditions, and the low cost of ingredients from which they are made, the vinyl resins have a wide application in the production of molded articles; as well as in the finishing arts, as in lacquers, varnishes, etc. These vinyl resins are resinous polymerization products of vinyl compounds; and the resins which have proven most desirable in this class are those obtained by the polymerization of vinyl acetate, vinyl chloride, and mixtures of vinyl acetate and vinyl chloride, and by mixing polymerized vinyl acetate and polymerized vinyl chloride. These are polymerized vinyl esters.

In molding polymerized vinyl ester resins, however, great difficulty has been encountered because of the very narrow range of temperature in which it has been possible advantageously to press and mold these materials. A certain minimum temperature is of course necessary to obtain sufficient plasticity for molding. Heretofore it has been deemed essential to keep the temperature down close to this minimum temperature which is necessary for plasticity; because if the temperature is raised even a few degrees above that minimum temperature—say five or ten degrees centigrate—the resin discolors very badly, and upon prolonged heating at even a slightly elevated temperature it blackens and becomes opaque. Indeed, even close to the minimum temperature necessary for plasticity there is discoloration; and this discoloration tends to become progressively greater as the temperature is increased. It was to keep this discoloration as low as possible that the temperature of molding has heretofore been kept low, and within a very few degrees of the minimum temperature necessary for plasticity.

But if molding is done with the polymerized vinyl ester heated barely to this minimum temperature, and the molding and pressing are carried out at that low temperature, the pressing operation sets up stresses which remain in the molded article after the latter has cooled, and which tend to relieve themselves in the course of time, almost inevitably producing a distortion of such molded article. These stresses and the resultant distortion may be due to the lack of complete plasticity at this low temperature. Nevertheless, this has usually been considered a lesser evil than the discoloration, and the molding operation of vinyl-ester resins has in general been carried out at temperatures quite close to the minimum necessary for plasticity. The maintenance of the temperature within this narrow range has involved a very high degree of skill and care.

I have discovered that by adding or incorporating an anti-oxidant in the vinyl resin prior to molding I can greatly reduce and at least in some cases practically eliminate the tendency to discolor, and thereby make it possible to conduct the molding operation at a materially higher temperature; so that I not only get a product which is substantialy free from objectionable discoloration, but also get one which is substantially free from internal stresses which tend to distort it, and at the same time reduce materially the required skill and care, which have heretofore been necessary to maintain the molding temperature carefully within a narrow range. Because of this, I am able to obtain from the polymerized vinyl esters molded products which have a greatly increased range of applicability, and which are free from various objections to hitherto known products molded from such polymerized vinyl esters, and to do this at reduced cost.

By the term "anti-oxidant", I mean a substance which under the conditions of molding tends to prevent oxidation of the polymerized vinyl esters being molded and/or the discoloration, which is probably due to such oxidation. That is, I have discovered that the discoloration during the molding process is due to the presence and action of oxygen, absorbed in the resin and/or on its surface either by physical absorption or in the form of peroxides, such as those which may have been used in producing the polymerization. The anti-oxidant somehow prevents this oxygen from producing the objectionable discoloration even at temperatures which are considerably elevated, and probably acts by reduction. So far as I am aware no one heretofore has been able to prevent or counter-act the discoloration apparently thus caused by the oxygen. Thus by the term "anti-oxidant" I mean to include any substance which when added to or incorporated in the polymerized vinyl resin reduces or eliminates the tendency to discolor; and therefore the examples which I give below of anti-oxidants are merely examples, to illustrate and not to limit my invention.

Among the anti-oxidants which I may use, certain general classes have been found highly effective. Two most important classes are the sulfhydryls and the morpholines.

The sulfhydryls in general prevent the discoloration above noted to a tremendous extent. So do their salts, including xanthates. Both the sulfhydryls and their salts have this effect apparently regardless of the nature of the radical which may be attached to the sulfhydryl group. Such radical may be either aliphatic or aromatic; but the sulfhydryl compounds with an aromatic radical attached to the sulfhydryl group are preferable, since the most striking improvement in reducing discoloration in the vinyl resins is obtained by their use.

The following are examples of sulfhydryl anti-oxidants which may be used: potassium ethyl xanthate, sodium lauryl xanthate, p-thiocresol, β-thionaphthol, thioglycollic acid, amyl sulfide.

In the class of morpholines, either the aromatic or the aliphatic morpholines may be used, for they appear to be about equally efficacious.

The following are examples of morpholines which may be used: cyclohexylmorpholine, β-hydroxyethylmorpholine, benzylmorpholine, p-hydroxyphenylmorpholine, phenylmorpholine.

It is often of advantage to use a plurality of anti-oxidants, as by their co-action they produce a greater improvement than is ordinarily obtainable with a single anti-oxidant. When combinations of anti-oxidants are used, I deem it preferable that at least two of them shall be of different classes, such as a sulfhydryl and a morpholine.

The amount of anti-oxidant used may vary widely. I have obtained good results with as little as 0.01%, and with as much as 1%; and these values are evidently not limits of the range of proportions in which the anti-oxidants may be used.

In addition to using anti-oxidants with the vinyl resins, I find that it is desirable for best results to avoid contact between the resin and any oxidation catalyst, especially iron and/or copper and/or their salts and other derivatives; as the presence of such oxidation catalyst sometimes causes an objectionable discoloration, even in the presence of anti-oxidants. While this discoloration resulting from contact with an oxidation catalyst is not always as serious and as great when anti-oxidants are present as that which occurs when no anti-oxidants are used in the molding of these resins, yet in certain cases, particularly if the anti-oxidants used are some of the phenolic and amino derivatives, (which classes have been investigated and found to possess anti-oxidant properties, though not so pronounced in the improvement produced as are the sulfhydryls and the morpholines,) a serious discoloration nevertheless occurs. Indeed, although pure tin probably does not cause discoloration, yet the contamination from a tin foil protective lining of brass or copper molds has been found sufficient to cause a surface blackening of the molded resin, apparently from copper and/or iron in or on the surface of the tin foil. If the molding surfaces of the molds are of aluminum or magnesium, however, no such surface blackening is observed.

Some of the modified resins which I thus obtain from polymerized vinyl esters are quite transparent, while others, although obtainable substantially free from objectionable discoloration, are opaque or translucent. In either case, they may be used for widely varying purposes where molded synthetic resins are desired. In addition, the transparent resins which I obtain may be used effectively where opaque resins are not as serviceable. For instance, any of my substantially transparent resins may be used as a thin intermediate layer between two sheets of glass, to produce a shatter-proof glass; the intermediate layer, while in the plastic stage, being pressed between the two sheets of glass, to which it adheres on cooling.

The following examples, showing tests actually made, demonstrate the advantages of my invention. In order to get true comparisons, including one with the unmodified polymerized vinyl resin as a control, the same equipment and technique were used for molding in all the examples, save as specifically noted. The mold used was a stainless steel box approximately 2 inches by ¾ inch by ⅛ inch, set in plaster in a suitable support; and provided with a flat cover plate, which was made of brass, set in plaster, and movable to cover and uncover the box; with suitable mechanism for pressing the cover upon the box. The working or inner surfaces of the steel box and the under surface of the cover plate were carefully protected with either tin foil or aluminum foil; but aluminum foil is found to be better because of the presence in tin foil of some oxidation catalyst, such as iron and copper. The cover plate was provided with a lateral hole to receive the bulb of a thermometer, for the determination of temperature. The molding powder used was packed into the metal box, with a sufficient excess above the upper surface of the box to allow for the loss of volume during molding. The cover was put in place on the packed box, and the whole placed in a hydraulic press and heated by means of hot plates at the top and bottom, due regulation of temperature being thus effected. The tests were conducted under comparable conditions, except as specifically noted in the examples.

The molding powder used for the comparative tests given in the example was a co-polymerized product of a mixture of vinyl chloride and vinyl acetate; but generally corresponding results can be obtained with other polymerized vinyl compounds, such as vinyl chloride alone, vinyl acetate alone, and mixtures of the polymerized esters.

The control

Example 1.—The molding powder, without any added anti-oxidant, was pressed in the mold as outlined above. The temperature was kept within the range of 125° C. to 136° C., for a total of 23 minutes. Eleven minutes of this period was with the temperature between 130° C. and 135° C.; and for the remaining 12 minutes the temperature was between 125° C. and 130° C. The specimen thus obtained was well molded, but was practically opaque; although if sufficiently strong light were used a slight translucency was discernible. It was of a very dark green color. The specimen was typical of those obtained with the vinyl resins unmodified by anti-oxidants.

Sulfhydryl anti-oxidants

Example 2.—100 parts of the molding powder were mixed mechanically with 1 part of potassium ethyl xanthate. This mixture was pressed in the same manner as before, but the temperature was allowed to rise to a maximum of 151° C. In spite of the higher temperature, the final product was a translucent material, of a light gray color; and showed an unquestionable superiority in color over the product obtained from the untreated resin.

*Example 3.*—120 parts of the molding powder were mixed with 1 part of powdered sodium lauryl xanthate. The mixture was pressed and molded as before, and the temperature was between 125° C. and 139° C. for a total of 23 minutes—two minutes between 125° C. and 130° C., and the remaining 21 minutes between 130° C. and 139° C. The molded product obtained was translucent, and quite light in color; and it was decidedly superior in color to that obtained from the use of the untreated resin.

*Example 4.*—200 parts of the molding powder were mixed with 1 part of powdered p-thiocresol. The mixture was molded as before, but the temperature was allowed to rise to 140° C. In spite of this increased temperature, the molded product obtained was beautifully white.

*Example 5.*—250 parts of the molding powder were mixed with 1 part of β-thionaphthol, and the mixture was molded as before, with a maximum temperature of 155° C. The product was quite transparent, and light yellow in color.

*Example 6.*—1 part of thioglycollic acid was spread on a glass plate and there mixed thoroughly with 200 parts of the molding powder, with a spatula. The mixture thus obtained was molded as before, and was held in the mold for about 26 minutes with the temperature kept between 125° C. and 136° C. Of these 26 minutes, 2½ minutes were with the temperature below 130° C., while the remaining 23 minutes were with a temperature above 130° C. The specimen obtained was dark in color, but transparent; and distinctly superior in color to that obtained in Example 1.

*Example 7.*—100 parts of the molding powder were mixed with 1 part of amyl sulfide in the same manner as in Example 6; and the mixture was molded as before. The temperature range was between 125° C. and 142° C., for 24 minutes, of which 22 minutes was above 130° C. The molded product was of a light greenish yellow color, having a definite superiority over the product of Example 1, although not so great as the superiority obtained in some of the other examples.

Morpholine anti-oxidants

*Example 8.*—165 parts of the molding powder were mixed with 1 part of cyclohexylmorhpoline in the same manner as in Example 6. The mixed material was molded, with the temperature maintained between 125° C. and 153° C. for a period of 26 minutes, and with the temperature actually reaching the maximum of 153° C. The molded specimen obtained was beautifully transparent, and only slightly yellow in color.

*Example 9.*—165 parts of the molding powder were mixed with 1 part of β-hydroxyethylmorpholine, in the same manner as in Example 6. The mixture so obtained was molded as before, with the temperature in the range from 125° C. to 151° C. for a period of 37 minutes, during a large part of which the temperature was in the upper part of such range. The product obtained was quite transparent; and light orange in color in the thicker layers, but almost colorless in thin layers.

*Example 10.*—400 parts of the molding powder were mixed with 1 part of benzylmorpholine, in the same manner as in Example 6. The mixture was molded as before, with the temperature maintained between 130° C. and 139° C. for a period exceeding 35 minutes. The molded product was quite transparent, and of a beautiful rose color.

*Example 11.*—100 parts of the molding powder were mixed with 1 part of powdered p-hydroxyphenylmorpholine; and the mixture was molded in the same manner as in other examples, with a maximum temperature of 155° C. The product obtained was quite transparent, and of a light rose color.

*Example 12.*—12,000 parts of the molding powder were mixed with 1 part of powdered phenylmorpholine. The mixture was molded as in other examples, with a temperature kept within the range of 125° C. to 140° C. for a period exceeding 27 minutes, and above 130° C. for 20 minutes. The product obtained was very dark in reflected light, but olive green in color in transmitted light. Although the amount of anti-oxidant used was less than 0.01%, yet the final product was lighter in color and generally superior in appearance to the control specimen of Example 1, even though the latter was obtained at a lower temperature level.

Mixtures of anti-oxidants

*Example 13.*—1000 parts of the molding powder were mixed with 5 parts of p-thiocresol and 3 parts of cyclohexylmorpholine. In making the mixture, the p-thiocresol, in powdered form, was mechanically mixed with half of the molding powder, and the cyclohexylmorpholine, which was liquid, was mixed with the other half of the molding powder in the manner described in Example 6; and then the two halves were mixed together. The resultant mixture thus obtained was molded in the manner already described, with the temperature in the range from 130° C. to 139° C. for 20 minutes, of which 16 minutes were above 135° C. The final product obtained was beautifully transparent and almost colorless; and it was superior not only to the control specimen of Example 1, but also to the products which were obtained by either of the anti-oxidants used alone. (Compare Examples 4 and 8.)

*Example 14.*—100 parts of the molding powder were mixed with 3 parts of thioglycollic acid and three parts of β-hydroxyethylmorpholine. Each of the anti-oxidants was mixed separately with half of the molding powder in the manner of mixing described in Example 6; and then the two halves were mixed together. The resultant mixture was molded under pressure in the same manner as in other examples; with the temperature in the range from 130° C. to 137° C. for a period of 20 minutes. The final molded product obtained was transparent, and very light in color, and superior not only to the control specimen of Example 1 but also to products obtained by the use of either anti-oxidant alone. (Compare Examples 6 and 9.)

Shatter-proof glass

*Example 15.*—1000 parts of the molding powder were mixed with three parts of p-thiocresol and three parts of cyclohexylmorpholine, in the same general manner as described in Example 13. The final mixture so obtained was pressed under heat between two pieces of glass, the temperature rising to 150° C. The resulting laminated product, after being cooled, consisted of the two pieces of glass with a very thin layer of the resin between them and adhering to and joining them. The specimen of glass so obtained was perfectly transparent, and practically colorless. This composite glass is more stable in color under the action of light than is the composite glass obtained by the common process of cementing two sheets of glass with transparent celluloid, for celluloid is ordinarily markedly affected by light.

The anti-oxidants which are used in the examples given above are all known compounds, with the single exception of cyclohexylmorpholine; which so far as I can discover is a new compound which I have invented. Cyclohexylmorpholine may be prepared as follows:

9.9 grams of cyclohexylamine are boiled under a reflux condenser for ten hours with 14.2 grams of di-chloroethyl ether and 8 grams of sodium hydroxide dissolved in 100 cc. of water. The resultant mixture is extracted with ether, which takes up the cyclohexylmorpholine which was produced. The ether is evaporated, leaving an oil; which is treated with water, acetic anhydride, and a drop of sulphuric acid in order to acetylate any unchanged cyclohexylamine. Very dilute hydrochloric acid is added to dissolve the cyclohexylmorpholine, and the solution is filtered. The filtrate is neutralized with sodium hydroxide; whereupon an oil separates out. The bulk of this oil may be separated by decantation; and the yield may be increased by extracting the remaining aqueous liquid with ether, and distilling the ether solution thus obtained. The cyclohexylmorpholine thus obtained is distilled in vacuo, and the distillate obtained is a colorless oil.

I claim as my invention:

1. The process of producing molded articles of vinyl ester resins, which consists in adding a sulfhydryl to the vinyl ester resin, and then molding the so-treated vinyl ester resin under heat and pressure.

2. The process of producing molded articles of vinyl ester resins, which consists in adding a morpholine to the vinyl ester resin, and then molding the so-treated vinyl ester resin under heat and pressure.

3. The process of producing molded articles of polymerized vinyl esters of the class consisting of polymerized vinyl chloride, polymerized vinyl acetate, mixtures of polymerized vinyl chloride and polymerized vinyl acetate, and polymerized mixtures of vinyl chloride and vinyl acetate, which consists in adding a sulfhydryl to such polymerized vinyl ester, and then molding the so-treated vinyl ester under heat and pressure.

4. The process of producing molded articles of polymerized vinyl esters of the class consisting of polymerized vinyl chloride, polymerized vinyl acetate, mixtures of polymerized vinyl chloride and polymerized vinyl acetate, and polymerized mixtures of vinyl chloride and vinyl acetate, which consists in adding a morpholine to such polymerized vinyl ester, and then molding the so-treated vinyl ester under heat and pressure.

5. The process of producing molded articles of vinyl ester resins, which consists in adding to the vinyl ester resin a sulfhydryl and a morpholine as anti-oxidants, and then molding the so-treated vinyl ester resin under heat and pressure.

6. The process of producing molded articles of vinyl resins, which consists in adding p-hydroxyphenylmorpholine to the vinyl resin, and then molding the so-treated vinyl resin under heat and pressure.

7. The process of producing molded articles of vinyl resins, which consists in adding potassium ethyl xanthate to the vinyl resin, and then molding the so-treated vinyl resin under heat and pressure.

8. The process of producing molded articles of vinyl resins, which consists in adding thioglycollic acid and $\beta$-hydroxyethylmorpholine to the vinyl resin, and then molding the so-treated vinyl resin under heat and pressure.

9. A molding material, comprising a vinyl ester resin having a morpholine incorporated with it.

10. A molding material, comprising a vinyl ester resin having a sulfhydryl and a morpholine incorporated with it.

ISADORE M. JACOBSOHN.